May 17, 1966 G. SMITH 3,251,329
JIB ATTACHMENT SYSTEM
Filed June 8, 1964 4 Sheets-Sheet 1
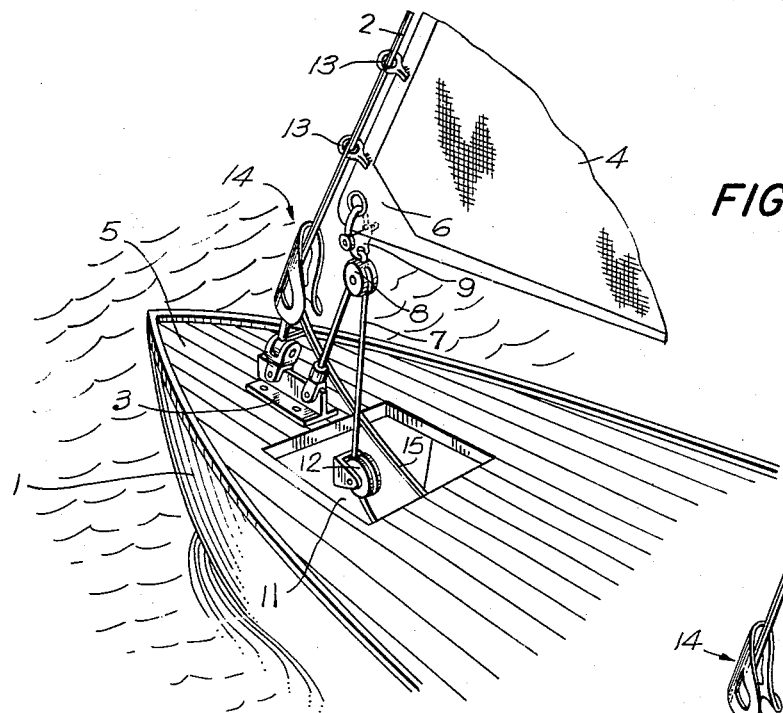
FIG.1
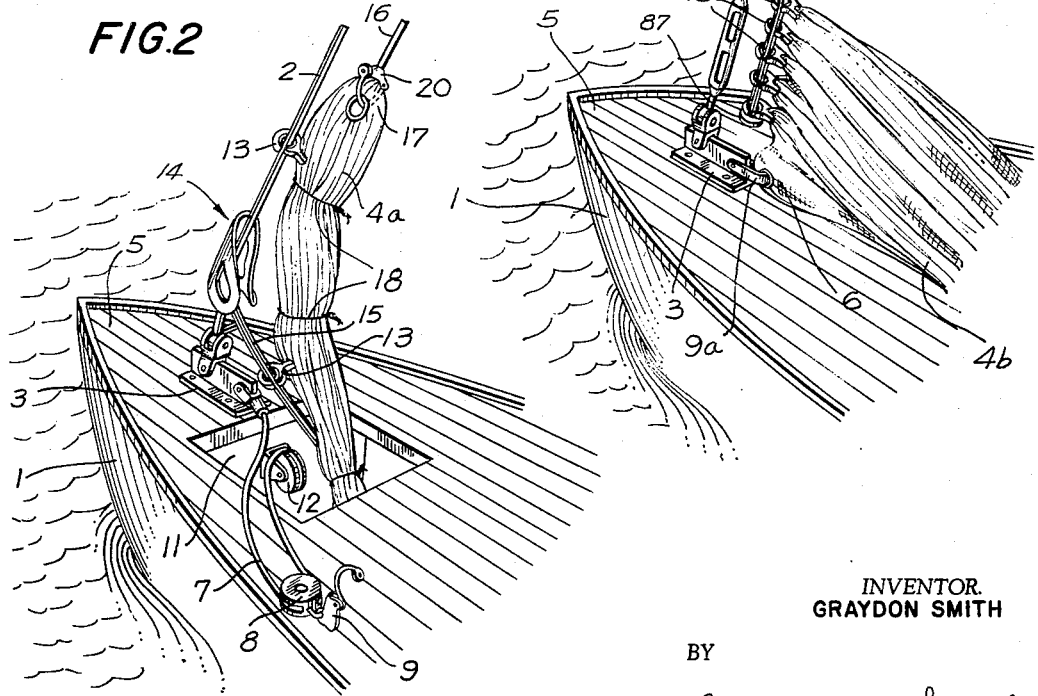
FIG.2
FIG.3
INVENTOR.
GRAYDON SMITH
BY
Curtis, Morris & Safford
ATTORNEYS May 17, 1966 G. SMITH 3,251,329
JIB ATTACHMENT SYSTEM
Filed June 8, 1964 4 Sheets-Sheet 2
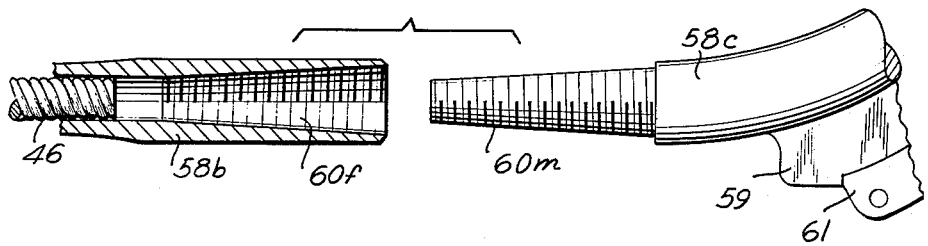
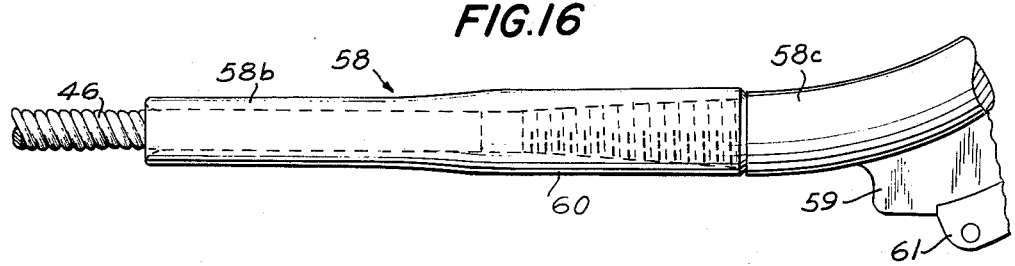
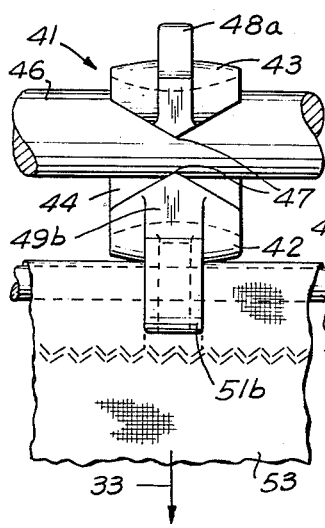
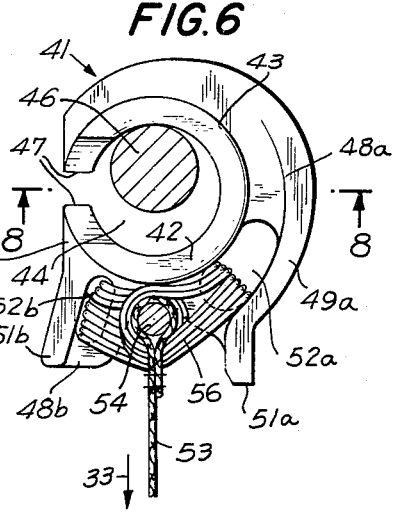
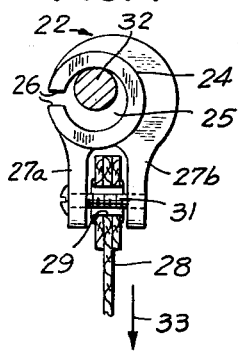
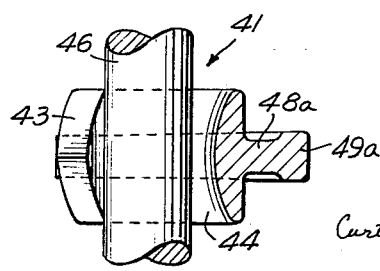
INVENTOR
GRAYDON SMITH
BY
Curtis, Morris & Safford
ATTORNEYS May 17, 1966  G. SMITH  3,251,329
JIB ATTACHMENT SYSTEM
Filed June 8, 1964  4 Sheets-Sheet 3
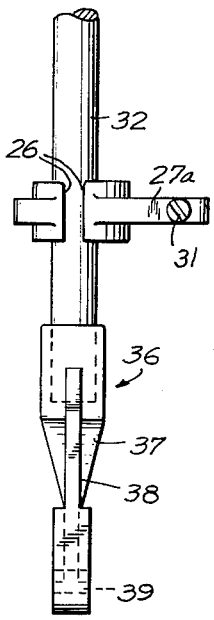
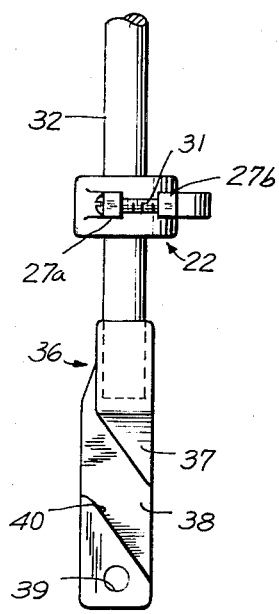
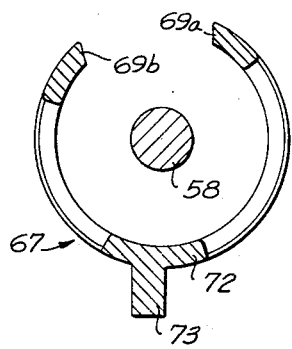
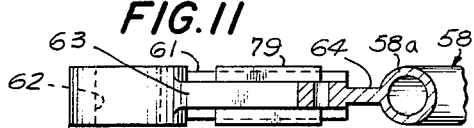
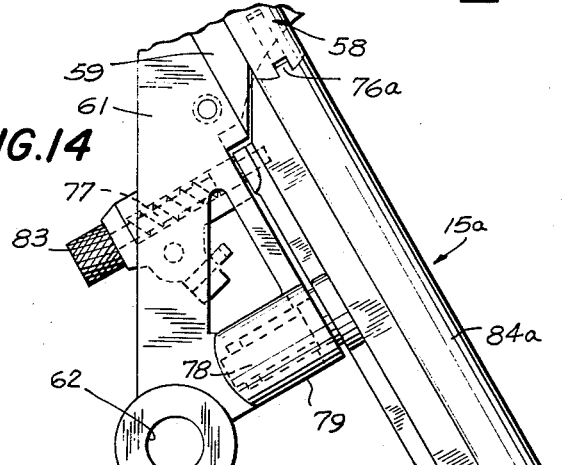
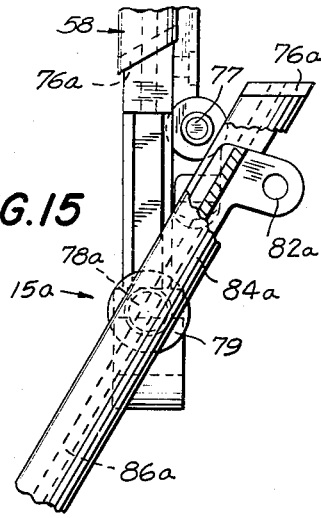
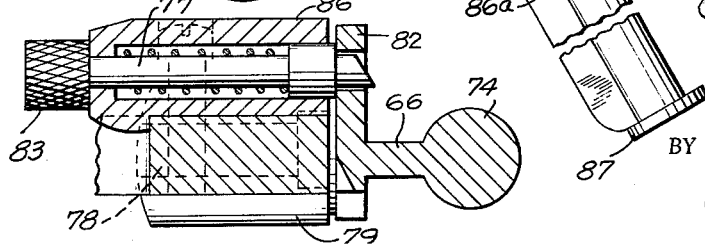
INVENTOR.
GRAYDON SMITH
BY Curtis, Morris & Safford
ATTORNEYS May 17, 1966  G. SMITH  3,251,329
JIB ATTACHMENT SYSTEM
Filed June 8, 1964  4 Sheets-Sheet 4

INVENTOR
GRAYDON SMITH
BY
Curtis, Morris & Safford
ATTORNEYS

United States Patent Office 3,251,329
Patented May 17, 1966

3,251,329
JIB ATTACHMENT SYSTEM
Graydon Smith, 21 Lexington Road, Concord, Mass.
Filed June 8, 1964, Ser. No. 373,354
25 Claims. (Cl. 114—102)

This invention relates to sail rigging hardware, and more particularly to hanks for stay sails and apparatus for lowering and raising such sails.

Securing stay sails, especially jib sails, to stays such as a jib stay has long been a problem, not so much from the standpoint of holding the sail on the stay, but with respect to attaching the sail to the stay and removing it therefrom. Rings, clasps or other devices for actually holding the sail on the stay are called hanks, and are a source of problems when sails are changed, hoisted and lowered.

The problems are acute in racing sailing where serious-minded competitors vie one another, and time in seconds is critical to success or failure. But they also exist for leisure sailors since convenience and ease are impaired by sail rigging problems. Changing of sails is an important part of sailing, whether pleasure or competitive, particularly of foresails such as jibs and genoas, to account for changes in wind direction, tacks and weather.

Hanks of various kinds have been used. Simple rings passed through the cringles of sails and over spars are very old. Such rings have been used on stays as well. But stays must be fastened at each end and taut, and therefore such rings generally are impractical for stay sails since the sails cannot easily be removed and changed, particularly under running conditions. Various other hanks have been devised, many of them having moving parts such as a bar or arm pivoted to swing open in some fashion to release the hank from the stay. However, the pivot often must be "stiff," or means must be provided, to keep the arm closed to prevent detachment of the hank from the stay while sailing. Such means often are so tight that the hanks can be opened even when desired only by considerable force. The force commonly is applied by a tool, such as a screwdriver or pliers, and sailors frequently keep a tool handy for that purpose. Having to use a tool is time consuming and inconvenient. Moreover, the pivot often is corroded, making opening the hank still more difficult. Such hanks may also have to be closed after being put on a stay, another time consuming step since a sail may have ten, twenty or more hanks.

Another commonly used hank is rather like a clasp in that there is a slidable bolt closing a cut-out portion in the stay-surrounding loop. The bolt usually is spring-loaded and highly susceptible to being "frozen" by corrosion. Other disadvantages of this type of hank are that the bolt of each hank on a sail must be opened to remove the sail from the stay. And if a sail is to be raised, each hank of the new sail must be opened, placed on the stay and closed. The inconvenience involved with and the loss of valuable moments by having to manipulate large numbers of such hanks each time a sail is taken down and stored and another mounted and hoisted are considerable.

In racing it is desirable to be able to hoist a new sail as soon as a sail is taken down rather than, prior to raising the new sail, having to secure it to the stay after the other is lowered. The time necessary to mount the new sail advantageously could be spent while under way, thereby reducing the time required for changing sails.

With those problems and considerations in mind, it is an object of this invention to provide means for securing sails to stays. Another object is to provide such means as unitary pieces without moving parts to avoid having to manipulate them during removal and mounting of sails on stays. A further object is to provide hanks that can quickly and easily be removed from stays. Still another object is to provide means for the positioning in readiness of a sail prior to the lowering of another sail so that the positioned sail need only be hoisted. Other objects of the invention will be in part discussed and in part apparent in the following disclosure.

To facilitate understanding the invention, reference will be made to the accompanying drawings wherein—

FIGURES 1, 2 and 3 are perspective views and show the fore section of sailboats having the devices of the invention;

FIGURE 4 is a plan view and shows a hank secured to a sail and to a stay;

FIGURES 5A and 5B are elevations and show a stay fitting for use with the hanks of the invention;

FIGURE 6 is a plan view and shows another hank securing a stay sail to a stay;

FIGURE 7 is an elevation and shows the hank depicted in FIGURE 6;

FIGURE 8 is an elevation in section taken along the line 8—8 of FIGURE 6 and shows the hank thereof;

FIGURE 11 is a section taken along the line 11—11 of FIGURE 9 and shows the hank removal or storage end of the stay fitting;

FIGURE 12 is a section taken along the line 12—12 of FIGURE 9 and shows the gate holding device of the stay fitting;

FIGURE 13 is a section taken along the line 13—13 of FIGURE 9 and shows the alignment shoe of the stay fitting;

FIGURE 14 is a plan view and shows a sail magazine adapted for a stay fitting of the type shown in FIGURE 9;

FIGURE 15 is an elevation and shows the magazine of FIGURE 14;

FIGURE 16 is a plan view and shows a joint in the rail of the stay fitting shown in FIGURE 9; and FIGURE 17 is a plan view and shows the elements of the joint shown in FIGURE 16.

Figure 9:
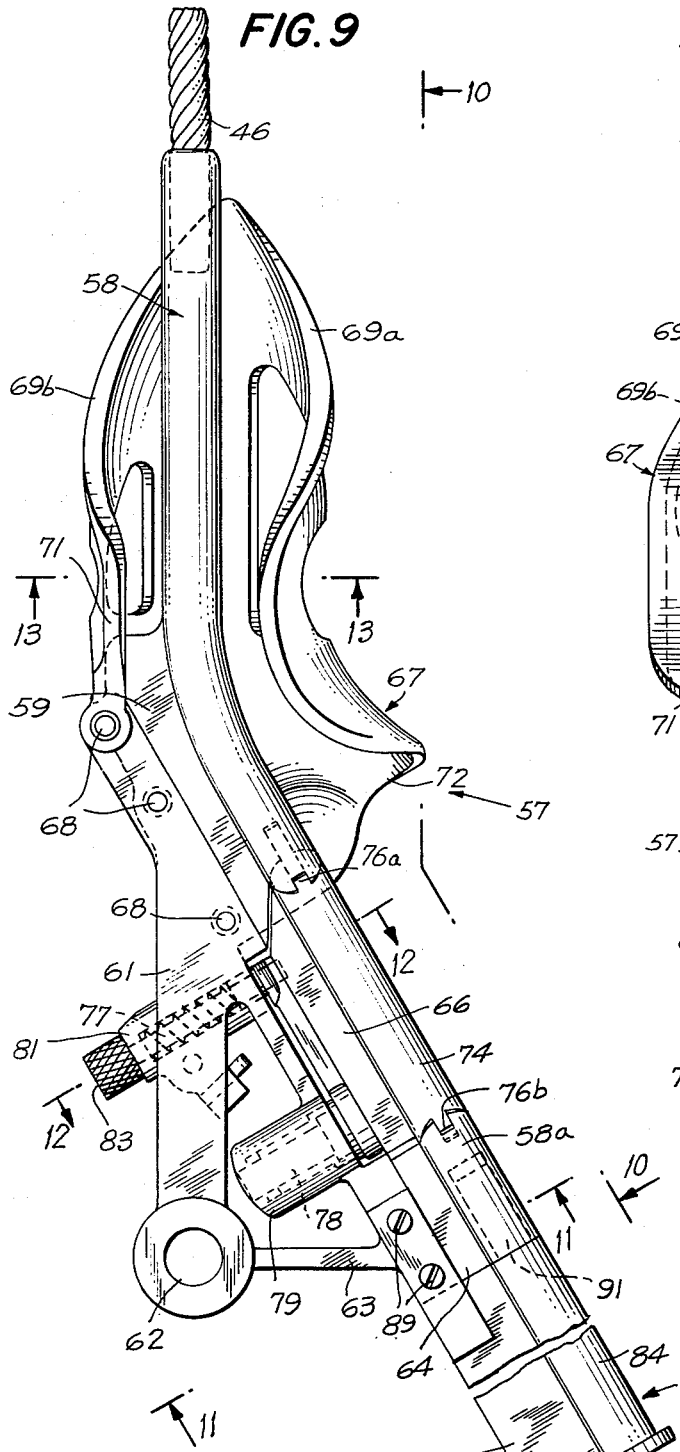
FIGURE 9 is a plan view and shows a stay fitting for removing sails secured by the hanks of the invention from stays.

The sailboats partially shown in FIGURES 1 to 3 have hulls 1 and jib stays 2 extending upwardly from jib stay plates 3 on the decks 5 at the bows to masts (not shown). A jib sail 4 is shown in FIGURE 1 set from the stay 2 and held at the tack 6 by the jib down-haul line 7 from the jib stay plates 3 around a block 8, secured to the tack 6 by a snap shackle 9, and through a hatch 11 around another block 12 to a winch below deck (not shown). A plurality of hanks 13 secure the sail 4 to the stay 2. At the lower end of the stay 2, and securing it to the deck 5. is the stay fitting 14 for removing the hanks 13, and thus the sail 4, from the stay 2. The storage or magazine 15 apparatus of the invention extends from the stay fitting 14 through the hatch 11 below deck where sails can be loaded onto it in readiness for hoisting. When sails are to be changed, the down-haul line 7 is slackened, the snap shackle 9 and block 8 are removed from the tack 6 of the sail 4, and the halyard (not shown in FIGURE 1) is released to lower the sail 4. As the sail 4 falls, the hanks 13 slide down the stay 2 onto the fitting 14 from which they slide or are taken off.

After the sail 4 has been taken down and off the stay, the halyard 16 is attached by a snap shackle 20 to the head 17 of another sail 4a in storage on the magazine 15, and the new sail 4a is hoisted. FIGURE 2 shows the sail 4a being raised. The hanks 13 slide along the magazine 15, over the stay fitting 14 and onto the stay 2. It will be noted that the sail 4a is "in stops" 18, that is, it is furled or rolled into a neat, long bundle and tied along its length by ratten twine. When the sail is fully hoisted, a sharp pull of the sheet will break the stops 18, freeing the sail 4a.

Many cruising boats and smaller sail boats do not have forward hatches 11. Another embodiment of the invention, adaptable to such boats, is shown in FIGURE 3. The stay fitting 14 is spaced farther away from the jib stay plate 3 on the deck 5 and the magazine 15 extends from the fitting 14. A flange 87 at the end of the magazine 15 retains the hanks 13 thereon. A shackle 9a secures the sails's 4b tack 6 to the jib stay plate 3. The sail 4b shown on the magazine 15 is in preparedness for hoisting or where it would be if lowered onto the magazine 15 instead of being removed at the stay fitting 14. Since the sail is not in stops the hanks 13 can gather adjacent to one another on the magazine which thus can be relatively short. It is also possible to detach the magazine 15 with the sail 4b on it and store the sail. Thus, the sail would always be in virtual readiness for hositing.

FIGURE 4 shows a hank 22 of the invention. The hank 22 has a body 23 with a hook 24, or a loop having a cut-away portion, forming a release slot 26 and a stay opening 25, and projecting arms 27. A sail 28 having a taped luff and a cringle 29 is held between the arms 27 by a bolt 31 passing through a hole in arm 27a, the cringle 29 and screwed into a tapped bore in the other arm 27b. Other means of fastening the hank 22 to the sail 28 will be apparent to those familiar with the art. The hook 24 portion fits around a stay 32, and the stay opening 25 formed by the hook 24 has a diameter larger than the thickness of the stay 32 so that the hank 22 and sail 28 can freely move around and along the stay. The stay 32 thickness is preferably about one-half the size of the stay opening 25. However, the release slot 26 is smaller than the stay 32 so that the hank 22 will not come off the stay. The slot 26 width is desirably about one-fourth the size of the stay opening 25, and therefore about one-half the stay thickness.

The release slot 26 is at one side of the hank 22, i.e., off the line of pull. The arrow 33 in the line of the sail 28 indicates the direction of pull of the sail. The stay 32 within the stay opening 25 of the hank 22 will be in that line of pull as will its point of contact against the hook portion 24. The slot 26, however, is not in the line of pull 33, in order that the stay 32 will not make contact with and pull against the edges of the slot 26. Those edges are chambered or rounded to avoid cutting or binding of the stay 32 by or in the slot 26. The slot is preferably located perpendicularly to the line of pull 33. Because of the slot's disposition out of the line of pull, the tailored slot edges and the slot's small size relative to the stay 32, the hank 22 and sail 28 are free to move around the stay even when under way without danger of the hank 22 binding on the stay or working its way off the stay.

It is desirable to gradually increase the thickness of the hook 24 portion of the hank 22, from the edge of the slot 26 to the body 23, since the hook must withstand the entire force of the sail's pull on the stay through the hank 22. The more-or-less T-shaped cross section of the hook 24 and body 23 portions provides additional strength.

For putting the hank 22 onto the stay 32, and removing it therefrom, a stay fitting 36 as shown in FIGURES 5A and 5B is provided. The fitting has a body portion 37 and a web portion 38 integral therewith. At one end of the body 37 is attached the stay 32, for example by swaging or threading it into a bore in the body. The web 38 has a shackle eyelet 39 at its end opposite, and in line with, the stay 32. Thus, the stay 32 can be secured through the stay fitting 36 to the deck of the boat in conventional ways. The body 37 can be tapered or shaped as illustrated to integrate smoothly with the web 38. The web 38 has a thickness slightly less than the width of the release slot 26 of the hank 22.

To remove the hank 22, it is passed along the stay 32 onto the body 37 of the stay fitting 36. The slot 26 of the hank is aligned with the web 38 and, due to their respective sizes noted above, the hank can be moved over and off the body 37 onto the web 38 from which it can be removed. The web 38 preferably projects out from the body 37 at distance great enough to prevent turning of the hank 22 around the fitting 36, i.e., so that once the slot 26 of the hank passes over the web 38, the hank 22 will be retained in alignment and easily slide off the fitting 36. The end of the web 38 adjacent the eyelet 39 can be shaped as a guide 40 to prevent the hanks 22 from fouling with the shackle means around the eyelet 39 and to guide the hanks off the web of the fitting 36.

Sails can be mounted on the stay 32 by passing the slots 26 of their hanks 22 over the web 38 and pushing the hanks over the body 37 onto the stay 32. The ease of putting stay sails onto stays and moving them by use of the hanks and stay fitting will be appreciated since the hanks are single pieces without any moving parts. Their slots only need to be aligned to the fitting web by turning them as necessary when taking a sail down. To raise a sail, the hank slot is merely slipped onto the web 38 from where the hank will pass over the fitting onto the stay when the sail is hoisted by pulling the halyard.

Another embodiment of the hanks of this invention, shown in FIGURES 6, 7 and 8, is especially adapted for use with a stay fitting and magazine apparatus, to be described, whereby during changing of sails virtually no attention need be given to the hanks. The hank 41 depicted in those figures has a body portion 42 and a hook-like portion 43 extending from it to form a central stay opening 44 through which a stay 46 passes. The end of the hook 43 and the body 42 form a slot 47 substantially smaller than the thickness of the stay 46. The slot 47 is out of the line of the sail's 53 pull indicated by the arrow 33.

Around one side of the body 42 is a rib 48a having a flange-like rim 49a whose end forms an ear 51a. In the rib 48a, between the rim 49a and the body 42, is an opening 52a. At the opposite side of the body 42 is another rib 48b having an opening 52b and a flange-like rim 49b ending in an ear 51b. The weight of the hank is minimized for its designed strength by utilizing a relatively wide, but thin, body 42 and hook portion 43 with the rim 49 reinforced ribs 48. All the pull exerted by the sail 53 against the stay 46 in contact with the hank 41 passes through the side of the hank opposite the slot 47, that side being strengthened by the large rib 48a and rim 49a. The sail 53, having a luff rope 54, is secured to the hank 41 by lashings 56 passing through a cringle in the sail 53, around the luff rope 54 and through the openings 52 in the ribs 48. A larger number of lashings 56 pass through the opening 52a since the pull is transferred through that side of the hank.

Hanks 41 of the type just described have been made for a 12-meter boat having a jib stay 7/16" thick. The stay openings 44 of the hanks are 1" in diameter to pass over a 7/8" rail of the stay fitting (to be described) while the slot 47 is 1/4" to retain the hank 41 on the stay and to pass over the fitting web which is 0.2" thick.

Figure 10:
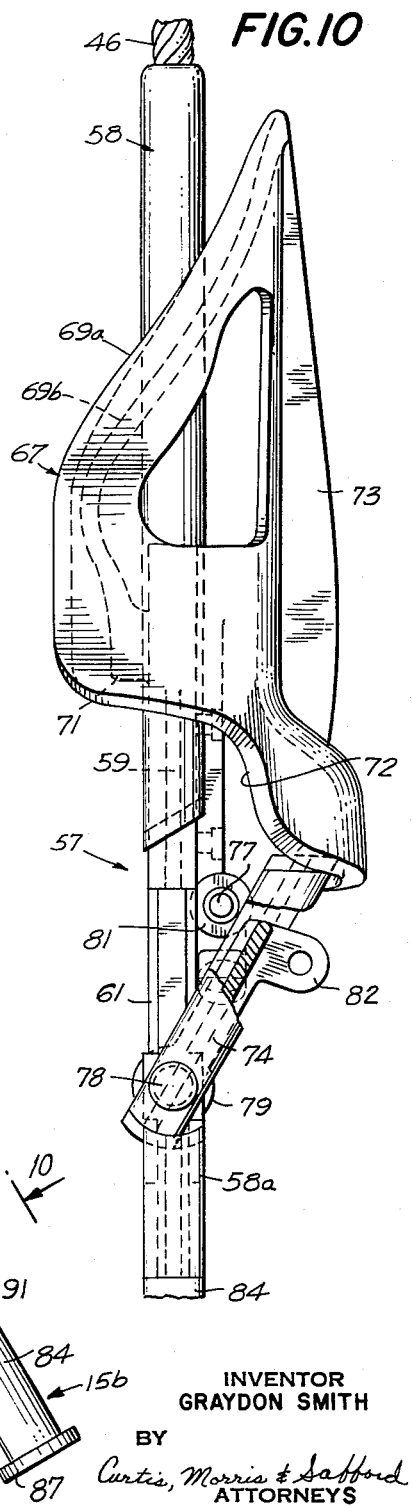
FIGURE 10 is an elevation taken along the line 10—10 of FIGURE 9 and shows the stay fitting thereof.

While the hanks 41 can be used with a stay fitting as shown in FIGURE 5, it is designed for use with a fitting of the type illustrated in FIGURES 9 and 10 wherein the stay fitting shown has means for automatic alignment of the hanks when a sail is being taken down, and optionally, a magazine or storage device for pre-loading and quick hoisting of another sail.

The stay fitting 57 has a rail 58 to which a stay 46 is swaged, threaded or otherwise secured. The rail 58 is bent to get it out of the line of the stay 46. Integrated with the rail 58 is a web 59 analogous to the web 38 of the stay fitting 36 previously described. The web 59 has an arm 61, extending downwardly in the line of the stay 46, provided with an eyelet 62 for shackling the fitting 57 and the stay 46 to the deck of a boat. Another arm 63 extends from the eyelet 62 to a rib 64 at the end 58a of the rail 58. The rib 64 is integral with the rail and prevents hanks 41 on the rail 58 from turning because their slots 47 pass over the rib 64. The rib 64 extends up to and is flush with the web 59, although in the embodiment depicted a separate rib 66 spans between the end rib 64 and the web 59 for reasons to be discussed. The rail's 58 diameter is smaller than the hank's 41 stay opening 44 and the web 59 is thinner than the width of the hank slot 47. Thus, the hank 41 can be taken off the stay 46 by sliding it onto the rail 58, aligning the slot 47 with the web 59, and passing the hank off the end 58a of the rail 58. When hoisting a sail, the hanks 41 are slipped onto the end of the rail 58a and pulled over the stay fitting 57 onto the stay 46. Other methods of utilizing the fitting 57 for changing sails will be discussed.

As mentioned, the stay fitting 57 is provided with an automatic hank alignment means 67, or a "shoe." The shoe 67 can be thought of as part of two hollow circular cylinders intersecting at an angle and having large portions cut out. The shoe 67 is around and spaced from the stay 46 end of the fitting rail 58, and preferably removably attached, e.g., by screws or bolts 68, to the fitting arm 61. The edges of the shoe 67 are cam surfaces 69 which begin at a common point and curve around the rail 58 in the manner shown in FIGURES 9, 10 and 13. The shoe's diameter is larger than the outer diameter of the hank body 42 and hank hook 43 so that the hank 41 can slide over the fitting 57 on the rail 58 through the shoe 67. However, the ears 51 of the hank 41, projecting outwardly from the hank body 42, engage the cam surfaces 69 of the shoe 67. Thus, as the hank 41 passes from the stay 46 onto the fitting rail 58, one of its ears 51a, 51b may engage the corresponding cam surface 69a, 69b, and the hank passing along the rail 58, due to the ear 51 riding on the cam surface 69, will be twisted about the rail until it reaches a point near line 13—13 of FIGURE 9 at which the slot 47 of the hank 41 is aligned with the fitting web 59. Beyond the alignment point, 13—13, the cam surfaces 69a, 69b effectively end and the hank 41 continues over the rail 58 from the end 58a of which it can be removed. The end of one cam surface 69b of the shoe 67 forms a projection 71 overlaying the arm 61 of the fitting 57 at the web 59 while the other surface 69a forms a projection 72 under the fitting 57 arm 61 whereby the shoe 67 can be secured to the fitting 57. A rib 73 extending the length of the shoe 67 reinforces it.

A hank 41 approaching the shoe 67 from the stay 46 can be as much as about 120° or more either way out of alignment with the web 59 and yet either of the ears 51a, 51b will engage one of the cam surfaces 69 whereby the hank 41 will be aligned. As a practical matter, the hanks will rarely be farther out of alignment, i.e., more twisted around the stay 46, because a crew member ordinarily will be gathering in the sail as it is lowered, and that gathering will bring the hanks around sufficiently to be engaged by the shoe 67.

An additional feature of the stay fitting 57 is a gate means in the rail 58. It comprises a gate 74 fitted integrally with the rail 58 by tongue and groove joints 76. The gate 74 is pivoted near one end, preferably the end away from the stay 46, so that it can be closed or open as shown in FIGURES 9 and 10, respectively. A rod or tube, of the same size as the rail 58, forms the gate 74 and has a rib 66 projecting from it. The rib 66 corresponds in thickness to the web 59 adjacent the rail 58 over which the hank slots 47 pass to prevent rotation of the hanks on the gate 74. When the gate 74 is closed, as in FIGURE 9, the rail 58, its end section 58a and the gate 74 form a continuous rail. When the gate is open, FIGURE 10, hanks passing along the fitting 57 from the stay 46 can be removed at the opening in the rail 58 provided by the gate 74 rather than at the rail end 58a as previously mentioned.

A bolt 78 from the gate 74 to a bearing 79 mounted on the fitting 57 holds the gate and permits it to be opened and shut. FIGURE 12 shows another bolt 77, slidable in a breech 81 on the projecting arm 72 and reinforcing rib 73 of the shoe 67 (see FIGURES 9 and 10), and preferably spring-loaded, extends into a loop 82 projecting from the gate 74 to lock the gate in the closed position. By a knurled knob 83 on the end of the sliding bolt 77, the bolt can be retracted from the loop 82 in order to open the gate. Other means to lock the gate 74 may also be used.

Magazines 15 adapted for use with the stay fitting 57 for keeping a new sail in readiness are shown in FIGURES 1 to 3, 9, 14 and 15. The magazines 15 are basically circular elongated rails 84, preferably tubular and somewhat flexible, having a projecting longitudinal rib 86 for retaining hanks and thus sails. A flange 87 may be used to close the end of the magazine opposite the fitting 57. The magazine 15b shown in FIGURE 9 is bolted or screwed 89 to the stay fitting rib 64, and a projecting pin 91 from its rail 84 fits into a recess in the end rail 58a. Other methods of securing the magazine 15b will be apparent. One such method, shown in FIGURES 14 and 15, is especially convenient for magazines 15a illustrated in FIGURE 3. The gate 74 and end rail 58a are eliminated as are their ribs 64, 66. The rail 84a and rib 86a of the magazine 15a replace those members. It will be seen that the magazine 15a is secured to the fitting 57 by slipping the bolt 78a into the bearing 79 (FIGURE 15) and turning the magazine until the bolt 77 enters the loop 82a projecting from the rail rib 86a to lock the magazine in place. The tongue and groove joint 76a in the rails 58, 84a also serves to lock the magazine 15a. The magazine 15a can easily be mounted and removed from the stay fitting 57, with or without sails on the magazine. The magazines can be as long as is necessary for holding the stay sails of a particular boat. For 12-meter boats where the sails are to be kept in stops, a magazine about 15 feet long is necessary, and advantageously passes through a hatch to below deck, as in FIGURES 1 and 2, where it can be fastened to the inside of the hull.

Changing sails using the hanks and stay fittings of this invention is a speedy and efficient operation. The sail expected to be used is loaded onto the magazine by sliding its hanks over the rail 84 and rib 86. They may be loaded by detaching the magazine from the fitting or, preferably, by removing the flange 87 of the magazine. When the order is given to change sails, the halyard is freed, the gate 74 is opened, and the sail is lowered. Its hanks are automatically aligned on, and pass along, the stay fitting 57 from which they come free at the open gate. The halyard is switched from the lowered sail to the sail on the magazine, the gate is closed and the sail is hoisted. The hanks slide over the continuous magazine and stay fitting rails onto the stay. During the actual change, the hanks can be ignored. They do not have to be opened or otherwise manipulated to remove them from or place them onto the stay; the shoe guides them onto the fitting and magazine. Using the magazine and stay fitting without the gate, the magazine is simply placed onto the fitting after the sail has been lowered to raise a new sail on the magazine. And the sail being lowered can be lowered directly onto an empty magazine and removed therewith for storage and subsequent use.

A further feature of the invention is shown in FIGURES 16 and 17. In the stay fitting of the invention, the web portion 59 must be thin in order to permit the slots 47 of the jib hanks to pass over it. But this web portion must be strong enough to withstand the entire tensile load on the stay. In the case of a 12-meter boat, the web is thus required to withstand at least 24,000 pounds before breaking and, with practical dimensions, this requires that the material of which the fitting is made must have an ultimate tensile strength of at least 60,000 pounds per square inch, and preferably more, so that the thin web will not break. Many corrosion resistant materials having the required strength are available, but these are unsuitable for swaging to a wire stay, in part because they lack ductility, in part because their high strength itself makes swaging difficult and partly for other reasons. Accordingly, it has been found advantageous to construct the rail 58 of the stay fitting 57 as a two-piece adapter, that is, of two pieces, one 58b of a relatively ductile steel which can be swaged to a stay 46, and the other 58c of a high strength steel. The ductile piece 58b is swaged to the stay 46. The high strength piece is integrated with arm 61.

To secure the two parts 58b, 58c of the adapter rail together, a joint comprising a tapered thread 60 is utilized. That tapered thread provides a number of important advantages. Due to the taper the cross-sectional area is gradually transferred from one piece 58b to the other 58c down their united lengths. Likewise, the stress is transferred because the taper of the parts provides an increasing area to carry an increasing stress. To obtain an equal over-all strength using a straight thread would require a much larger outside diameter of the pieces 58b, 58c, which would interfere with or require redesigning of the hanks to be used with the fitting. Moreover, the tapered thread permits using longer thread, which would tend to bind if straight, because the member 58c carrying the male thread 60m can be inserted into the other member 58b a considerable distance, e.g., about two-thirds of the way, before the threads 60 engage. And along with the latter advantage is the fact that the threads 60 can be closely cut for tightly fitted joints and exceptional strength.

It is to be understood that the embodiments described and shown herein are illustrations of the inventive concepts disclosed, and that numerous changes, variations and modifications can be made in those embodiments without departing from the scope of the invention as defined in the appended claims.

I claim:

1. The combination of a stay hank and a stay, said hank having a slot in one side of its stay loop and said stay having adjacent one end securing means substantially in line with the longitudinal axis of said stay with a smaller dimension than the opening of said slot, whereby said hank can be removed from said stay by passing said slot over said means.

2. The combination of a hank and a stay fitting, said hank having a slot in one side of its stay loop, and said fitting having a web of thickness less than the opening in said slot and means for securing said web to a stay substantially in line with the longitudinal axis of said stay, whereby said hank can be removed from said stay by passing said hank slot over said web and passing said hank off said web.

3. The combination defined in claim 2 wherein said hank's slot has an opening substantially less than the diameter of a stay to be used therewith.

4. The combination of a stay hank having a slot in one side of its stay loop and a stay fitting for removing said hank from a stay, said fitting having a rail adapted to be integrated with a stay and to form an angle longitudinally thereof, and a web integrated to said rail with means for securing said fitting to a boat substantially in line with the longitudinal axis of said stay, said web having a thickness less than the opening of said slot, whereby said hank can be passed over said fitting and removed therefrom.

5. The combination defined in claim 4 wherein said hank is removed by passing it off the end of said rail.

6. The combination defined in claim 4 further including a magazine fitted to the end of said stay fitting onto which said hank can be passed.

7. The combination defined in claim 4 wherein said hank is removed by passing it over said rail onto said web and passing said slot over and off said web.

8. The combination defined in claim 4 wherein said rail has gate means capable of being opened from which said hank can be removed from said fitting.

9. The combination defined in claim 8 further comprising a magazine at the end of said fitting opposite the stay so that a sail mounted in readiness on said magazine can be passed over said fitting and hoisted on said stay.

10. The combination of a sail hank, said hank having a body, a stay loop portion with a slot at one side thereof extending from said body, means for fastening a sail to said body opposite said loop, and guide means projecting from said body on opposite sides of said fastening means, and a stay fitting, said fitting having a rail portion adapted to be integrated at one end with a stay and to extend at an angle longitudinally thereof, a web portion integral with said rail portion and having means in longitudinal alignment with said stay for securing said fitting and stay to a boat, and shoe means adjacent said rail portion for engaging said guide means to align said slot with said web portion, whereby said hank can be passed from a stay onto said rail portion, said slot passing over said web portion, and said hank can be removed from said fitting.

11. The combination defined in claim 10 wherein said hank is passed off the end of said rail portion.

12. The combination defined in claim 10 wherein said hank is passed over said rail portion onto said web portion and removed therefrom by passing said slot over and off said web.

13. The combination defined in claim 10 wherein said rail portion has gate means therein which can be opened so that said hank can be passed off said fitting at the opening of said gate means.

14. The combination defined in claim 10 further comprising a magazine at the end of said rail portion opposite said stay, whereby a sail can be mounted by hanks in readiness on said magazine and said hanks can be passed over said fitting onto said stay.

15. The combination defined in claim 14 wherein said magazine comprises an elongated rail over which the stay loop of said hank passes and a rib longitudinally at one side of said magazine rail over which said slot passes, said rib being aligned with said stay fitting web, whereby hanks mounted on said magazine are retained in proper alignment for passage over said fitting onto said stay.

16. The combination defined in claim 10 wherein said shoe means comprises two cam surfaces for engaging said guide means extending from a common point at one side of said stay fitting rail adjacent said stay around opposite sides of said rail, said surfaces being spaced from said rail to permit passage of said hank over said rail through said shoe.

17. The combination defined in claim 4 wherein said rail is comprised of two members, one of said members being adapted to be integrated to the stay and the other member integrated to said web, said members being secured together by a tapered threaded joint.

18. The combination of a stay hank having a slot in one side of its stay loop, a stay fitting for removing said hank from a stay, said fitting having a rail adapted to be integrated with a stay and to form an angle longitudinally thereof and a web integrated to said rail with means for securing said fitting to a boat, said web having a thickness less than the opening of said slot whereby said hank can be passed over said fitting and removed therefrom, and shoe means adjacent said fitting to align the slot of the hank with said web so that as said hank passes from a stay onto said rail the slot will pass over said web.

19. The combination of a stay hank having a slot in one side of its stay loop, a stay fitting for removing said hank from a stay, said fitting having a rail adapted to be integrated with a stay and to form an angle longitudinally thereof and a web integrated to said rail with means for securing said fitting to a boat, said web having a thickness less than the opening of said slot whereby said hank can be passed over said fitting and removed therefrom, and gate means in said rail capable of being opened from which said hank can be removed from said fitting.

20. The combination defined in claim 19 further comprising a magazine at the end of said stay fitting opposite said stay so that a sail mounted in readiness on said magazine can be passed over said fitting and hoisted on said stay.

21. A sail hank comprising a body having means for fastening a sail thereto and a stay loop, said stay loop having in one side substantially off the line of pull of said hank a slot substantially smaller than the thickness of a stay to which said hank secures a sail.

22. A sail hank as defined in claim 21 wherein said hank has a reinforcing rib extending around said stay loop and body on the side opposite said slot.

23. A sail hank comprising a body having means for fastening a sail thereto and a hook portion extending therefrom, said hook portion and said body forming at one side of said hank substantially off the line of pull of said hank a slot substantially smaller than the thickness of a stay around which said hook portion extends.

24. A stay fitting for securing a stay to a boat having a portion adjacent and integrated to a stay and of substantially the same size as said stay to permit easy passage of a hank from said stay onto said fitting, and having a portion over which said hank passes of substantially the same size as the hank and with means to secure said fitting to the boat, which fitting comprises a first part of substantially the same size as said hank and having means for securing the fitting to a boat, and a second part having one end of substantially the same size as said first part and adapted to be secured thereto and another end adapted to be integrated to a stay and of substantially the same size as said stay, one of said parts having a tapered male thread and the other part having a corresponding tapered female thread whereby said two parts can be threaded together to form said stay fitting.

25. A magazine for the storage of a sail and for use with a stay fitting having a rail adapted to be integrated to a stay and a web extending from said rail with means for securing said fitting to a deck whereby a hank for holding a sail on said stay having a slot in one side of its stay loop can pass over said rail and said slot can pass over said web which comprises an elongated magazine rail with means at one end for attachment to said stay fitting rail and means at the opposite end to limit the movement of a hank on said magazine rail, and a longitudinal rib projecting from said magazine rail, said rib having a thickness smaller than the slot of said hank and adapted to be co-planar with said stay fitting web when said magazine rail is attached to said stay fitting, whereby said hank can be passed over the stay fitting onto said magazine for storage and is retained in alignment thereon by said rib co-acting with said hank slot.

References Cited by the Examiner

UNITED STATES PATENTS

| | | | |
|---|---|---|---|
| 601,282 | 3/1898 | Sands | 114—108 |
| 1,798,772 | 3/1931 | Wood | 114—112 |
| 2,207,005 | 7/1940 | Haas | 287—125 |
| 2,925,798 | 2/1960 | Colgate | 114—102 |
| 3,006,308 | 10/1961 | Enke | 114—102 |
| 3,153,829 | 10/1964 | Luketa | 24—201 |

MILTON BUCHLER, *Primary Examiner.*

T. M. BLIX, *Assistant Examiner.*